United States Patent [19]
Morrison

[11] Patent Number: 5,888,256
[45] Date of Patent: Mar. 30, 1999

[54] MANAGED COMPOSITION OF WASTE-DERIVED FUEL

[76] Inventor: Garrett L. Morrison, P.O. Box 319, Unity, Me. 04988

[21] Appl. No.: 712,312

[22] Filed: Sep. 11, 1996

[51] Int. Cl.⁶ .............................. C10L 5/48; C10L 5/02; C10L 5/04

[52] U.S. Cl. ................................ 44/552; 44/504; 44/559; 44/567; 44/589; 44/590; 44/606

[58] Field of Search .............................. 44/504, 552, 559, 44/567, 589, 590, 606

[56] References Cited

U.S. PATENT DOCUMENTS

| | | | |
|---|---|---|---|
| 1,770,627 | 7/1930 | Roberts | 44/559 |
| 4,049,391 | 9/1977 | Marsh | 44/589 |
| 4,152,119 | 5/1979 | Schulz | 44/552 |
| 4,552,666 | 11/1985 | Müller | 44/552 |
| 4,615,711 | 10/1986 | Müller | 44/552 |
| 4,921,538 | 5/1990 | Lafser, Jr. et al. | 106/100 |
| 4,984,983 | 1/1991 | Enkegaard | 432/14 |
| 5,018,459 | 5/1991 | Judd | 110/346 |
| 5,141,526 | 8/1992 | Chu | 44/576 |
| 5,199,987 | 4/1993 | Ernstbrunner | 106/761 |
| 5,217,624 | 6/1993 | Yamane et al. | 210/751 |
| 5,224,433 | 7/1993 | Benoit et al. | 110/346 |
| 5,336,317 | 8/1994 | Beisswenger et al. | 106/745 |
| 5,392,721 | 2/1995 | Judd | 110/346 |
| 5,429,645 | 7/1995 | Benson et al. | 44/590 |
| 5,431,702 | 7/1995 | Schulz | 44/552 |
| 5,454,333 | 10/1995 | Von Seebach et al. | 110/101 R |
| 5,473,998 | 12/1995 | Allen et al. . | |

OTHER PUBLICATIONS

H.F.W. Taylor, Cement Chemistry, 1990, pp. 66, 67.

A. Obrist and TH. Lang; "Nicht–landwirtschaftliche verwertungs–möglicheiten von Klärschlamm unter besonderer Berücksichtigung der Verbrennung im Zementofen"; (Non–Agricultural Possibilities for Utilizing Clarifier Sludge With Special Consideration of Burning in a Cement Kiln) Teilstudie 3: pp. 73–75, section 4.3, pp. 103–104, Section 5.2.2.3, Jul. 1986; Holderbank AG, Switzerland (with English Translation).

*Primary Examiner*—Jerry D. Johnson
*Attorney, Agent, or Firm*—W. F. Fasse; W. G. Fasse

[57] ABSTRACT

A waste-derived fuel is prepared to have a particular chemical composition, including ash content, ash composition and fuel value, and physical properties as required by a particular fuel user or burning process. The fuel is prepared by collecting different waste materials, chemically analyzing each waste material, and then blending and mixing together several different waste materials in appropriate proportions to provide the desired chemical composition and fuel value. The fuel is prepared to have a homogenous, uniform, and constant composition over time. The fuel is suited for use by itself or mixed with conventional fuels to be burned as a primary fuel in the main burner of a cement kiln and pre-calciner. In that case, the fuel is preferably formulated to provide an ash composition that approximates the composition of normal cement raw material mix. The fuel can provide increased amounts of particular elements or compounds as required by the fuel user. The fuel preferably contains calcium compounds other than calcium carbonate, and has a reduced proportion of carbon and an increased proportion of hydrogen as compared to coal, whereby use of the fuel in cement kilns reduces the carbon dioxide emissions from both the calcining process and the combustion process.

34 Claims, 2 Drawing Sheets

Wet Process Kiln or Long Dry Process Kiln

Dry Process Kiln - Preheater/Precalciner

MANAGED COMPOSITION OF WASTE-DERIVED FUEL

BACKGROUND OF THE INVENTION

FIELD OF THE INVENTION

This invention relates to a method of processing waste materials to produce fuel for high temperature furnaces and kilns, and further relates to the waste-derived fuel produced by the method. The waste materials may include a broad range of solid, semisolid, pasty, sludge and liquid wastes. The waste-derived fuel is especially suited to be used in kilns such as cement kilns wherein the non-combustible residue of the fuel, referred to simply as ash herein, is mixed, as the fuel is burned, directly with the raw materials being fired in the kiln and thus is incorporated into the resultant kiln-fired product. The waste-derived fuel may be used as a supplemental fuel or a primary fuel in such kilns. The invention also relates to a method of reducing the emission of carbon dioxide during the manufacture of cement such as Portland cement.

BACKGROUND INFORMATION

Cement is usually manufactured in a rotary kiln. FIG. 1A schematically shows the general layout for wet or long dry process kilns used for manufacturing Portland cement. There are several types of kilns and variations within each type that are not detailed here. Equipment for operating the cement plant and pollution control systems for the kiln are not shown in FIG. 1A. Primary fuel and air are injected into the firing end of the kiln and are combusted to supply heat energy. Wet or dry raw materials (known as raw mix) for producing the cement product are injected into the feed end of the kiln opposite the firing end. As the kiln rotates, the raw materials move through the kiln in counter-current direction against the flow of the hot combustion gases, and are subjected to progressively higher temperatures until they attain the fusion point and form new chemical compounds. These new compounds, collectively called clinker, include calcium silicates, calcium aluminates, and calcium aluminum iron oxides, along with lesser amounts of several minor oxides, sulfates, and the like, which exit the kiln at the firing end, which is thus also called the clinkering end. Clinker is the desired end product from the kiln, and is later mixed with other materials, such as gypsum in the usual case, and then finely ground to produce Portland cement. Portland cement is the well known very fine gray powder which, when mixed with sand, aggregate such as stones, and water hardens to form concrete.

FIG. 1A shows the usual locations for the input of fuel, air, and raw materials, as well as the location for the output of flue gas in typical wet kiln or long dry kiln cases. Flue gas comprises a combination of gases produced by combustion of the fuel, drying of the raw materials, and calcining of the raw materials. In wet or long dry process kilns, waste material is sometimes added as a supplemental fuel at the mid-kiln location, where temperatures are high enough to assure combustion and destruction of the waste and derive fuel value therefrom. Waste type fuels that have conventionally been introduced at the mid-kiln location include hazardous wastes or whole or shredded used tires, as described in U.S. Pat. No. 5,224,433 (Benoit et al.) and U.S. Pat. No. 5,473,998 (Allen et al). The combustion of other waste materials in cement kilns is also known, as discussed below herein. The entire disclosure of each reference cited in this application is incorporated herein by reference to the extent applicable.

FIG. 1B schematically shows the known (short) dry process kiln, which is usually shorter than wet kilns or long dry kilns. A pre-heater or pre-heater/pre-calciner tower is used to partially process raw materials before they enter the horizontal rotary portion of the kiln. Namely, the raw materials are preheated or calcined, or both in the pre-heater/pre-calciner tower. In the present context, calcining refers to the conversion of calcium carbonate to calcium oxide plus carbon dioxide, which is a strongly endothermic reaction. Preheating and calcining require energy, which, in the case of pre-calciner kilns, is supplied to the pre-heater/pre-calciner system at the fuel input location shown in FIG. 1B. In wet or long dry kilns, preheating and calcining take place within the rotary kiln itself, using heat energy from the flue gas. Therefore, the energy requirement or fuel use within the horizontal rotary portion of the short dry kiln is reduced as compared to the long dry kiln. Furthermore, the dry process generally requires less energy than the wet process, because the wet process requires extra energy for first drying the raw materials.

The raw material mix for cement manufacture must be of a specific composition in order to result, after processing in the kiln, in specification cement, i.e. cement meeting the specifications established for properties including strength, set time, and composition by governmental and industrial standards organizations. In fact, the chemistry of all materials entering the kiln as well as the chemistry of the clinker product are carefully monitored to assure the quality of the clinker and the resultant cement. When normal, waste-free raw materials are prepared for use in a cement kiln, they are processed and mixed to form a raw mix providing a certain composition of chemical constituents that will remain in the kiln upon firing, for example that shown in Tables 1 or 2 below.

After firing (burning) the raw material mix within the kiln, the clinker that forms has a chemical composition related to but not the same as that of the raw material mix, due to chemical changes that take place during the firing. For example, carbon dioxide ($CO_2$) is usually released through calcining of the raw material mix during the firing or burning process, thus changing the composition of the contents of the kiln. In addition, portions of some materials, for example chloride, sodium, and potassium, may volatilize and be swept out of the kiln with the flue gas exiting the kiln. The materials lost during the firing process are generally known grouped together as "ignition loss" or "loss on ignition", as discussed below.

The impact on raw material as it is fired in a kiln and changed to clinker may be shown by the following example, in which carbon dioxide is released to the atmosphere and sodium and potassium concentrations in the product clinker are reduced through volatilization of the metal. The composition of "clinker" shown in Table 1 is based on the composition of the "raw mix" shown and reflects the loss of carbon dioxide and volatile metals, and has been recalculated to 100%.

TABLE 1

| Raw Mix | | Clinker | |
|---|---|---|---|
| $SiO_2$ | 13.00% | $SiO_2$ | 19.54% |
| $Al_2O_3$ | 3.30% | $Al_2O_3$ | 4.96% |
| $Fe_2O_3$ | 2.00% | $Fe_2O_3$ | 3.01% |
| CaO | 42.00% | CaO | 63.13% |
| MgO | 3.00% | MgO | 4.51% |
| $K_2O$ | 1.00% | $K_2O$ | 0.70% |

TABLE 1-continued

| Raw Mix | | Clinker | |
|---|---|---|---|
| $Na_2O$ | 0.70% | $Na_2O$ | 0.40% |
| $SO_4^=$ | 2.50% | $SO_4^=$ | 3.75% |
| Loss | 32.50% | Loss | 0.00% |

As fuel is burned in the cement kiln, the resulting ash residue is mixed with the raw material being processed in the kiln, and thus will also affect the composition of the clinker product. For this reason, the amount and chemical constituents of the residual ash of the fuel must be taken into account, in order to achieve and maintain the required chemical composition of the clinker. This has been achieved in the prior art by avoiding or limiting the proportional use of fuels having undesirable types or amounts of chemical constituents, or by adjusting the composition of the raw material mix itself to allow for the addition of fuel ash ingredients (see Taylor, H. F. W., Academic Press, Inc., San Diego, Calif. 92101, 1990, ISBN 0-12-683900-X, pg. 66).

For example, if the ash contains silica (but still within an acceptable level), then the silica content of the raw material mix will have to be reduced to achieve the proper total silica contribution to the clinker from the combined ash and raw material. On the other hand, if a potential fuel material contains unacceptably high levels of certain residue components, such as potassium or sodium, then that fuel material is conventionally avoided or used in very small quantities in conjunction with a primary conventional fuel so that the clinker composition is only minimally affected. In the prior art, if appropriate steps such as adjusting the raw mix to account for the addition of fuel ash components are not taken, then the clinker produced will be out of specification and the cement made from such clinker will not have the appropriate chemical and physical properties when used to make concrete.

Coal, oil, and natural gas are conventionally used as the primary fuel in cement kilns. These fuels have a known ash percentage and ash composition which is generally quite consistent and constant for a given fuel type. Therefore, the raw mix composition can be adjusted or specified once to accommodate the particular fuel, and only occasional minor changes need be made in the raw mix if the type of fuel or source of fuel is changed. The use of waste materials as fuel in cement kilns entails much greater problems in view of the great variability in ash content and chemistry of different types of waste and even of different batches of the same type of waste, and in view of the limited and/or inconstant supply of any particular type of waste.

Despite the above mentioned difficulties, it is advantageous to burn waste materials in cement kilns, for several reasons. Such wastes would otherwise have to be disposed in a landfill or other long term containment, or incinerated as a means of destroying the materials. Landfill disposal typically is more expensive and less desirable than disposal by recovering the useful energy value of the waste. While these wastes provide energy to the kiln system, the kiln operator typically charges a "tipping fee", or service charge for accepting and disposing of the waste. The tipping fee is charged because there usually is a cost for handling and/or for pollution control associated with the use of diverse waste streams. Thus, use of waste-derived fuel in a cement kiln provides a benefit to the fuel user and to the waste generator. Namely, the kiln operator may gain significant income from tipping fees as well as fuel value that reduces the demand for conventional fossil fuels, and the waste generator may have access to a lower cost disposal option for the waste. The environment also benefits from use of waste as fuel, because cement kilns have efficient destructive capacity for various wastes as fuel and resultant fuel combustion products, due to high burning zone temperatures and long retention times of materials in the high temperature zone. Valuable landfill space is conserved, fossil fuels are conserved, and wastes that might have contaminated land or water are efficiently destroyed.

According to the prior art, certain types of hazardous waste fuels and certain other wastes such as used tires can be accommodated as fuel supplements in cement kilns, as long as the supply of such wastes is reasonably constant, because these wastes have known ash percentages and known ash composition. Many other wastes, however, tend to be more problematic. If the composition of the waste, or the composition of ash present in the waste, or the availability of the waste changes over time, then use of the waste as a fuel supplement in the cement kiln is difficult and economically impractical. A variable ash composition added to the kiln as part of the waste-derived fuel would require constant adjustment of the composition of raw material mix entering the cement plant. Usually, enough raw material mix to operate a cement kiln for three to four days is prepared ahead of time and stored for use, so that rapid adjustments of the raw mix composition are not possible. Therefore, a variety of combustible wastes that might be suitable sources of energy have not been able to be used conveniently in cement kilns because of the inconstancy of the ash supply or composition.

Types of waste that have been used as fuel or that have been recycled or processed in a variety of high temperature kiln situations, including cement kilns, according to the prior art include waste tires, either whole or when reduced in size by some means (U.S. Pat. No. 5,473,998—Allen et al.); hazardous waste liquids, or solids or both (U.S. Pat. No. 5,454,333—Von Seebach et al.); agricultural waste, for example rice hulls; paper mill sludge (U.S. Pat. No. No. 5,392,721—Judd, U.S. Pat. No. 5,018,459—Judd, and U.S. Pat. No. 5,199,987—Ernstbrunner); soil, sludge, sand, rock or water contaminated with organic solvents and/or toxic metals (U.S. Pat. No. 4,921,538—Lafser, Jr. et al.); sewage sludge (U.S. Pat. No. 5,217,624—Yamane et al.); petroleum refinery sludge (U.S. Pat. No. 5,141,526—Chu); various hazardous combustible wastes (see U.S. Pat. No. 5,454,333—Von Seebach et al. or U.S. Pat. No. 4,984,983—Enkegaard) and non-hazardous low-grade fuel wastes such as wood, paper and chemical waste (U.S. Pat. No. 5,336,317—Beisswenger et al.).

Waste that has little or no fuel value, that is, principally inorganic waste, also may be added to cement kiln raw material mix. Cement kilns consume a large quantity of raw materials consisting principally of calcium carbonate ($CaCO_3$), silica ($SiO_2$), alumina ($Al_2O_3$), and iron oxide ($Fe_2O_3$). Raw materials also include lesser amounts of other compounds including magnesium carbonate or oxide, sulfur oxide (usually $SO_3$ or $SO_4$), and compounds of titanium, phosphorous, potassium, sodium, chloride, and others. Some of these may be desirable and some undesirable or detrimental in the raw material mix used for making cement. Each should be present as a set percentage of the whole or have an upper limit on the allowable percentage in the raw material mix that will be determined by the individual properties of each kiln system and the chemistry of its raw material supply. Industrial and other wastes that contain significant amounts of one or more of these compounds may be used to augment raw material for a cement kiln.

In all of the above listed uses of waste as fuel or a raw material supplement, ash from the waste mixes with the raw material being processed within the cement kiln, and thereby, the ash becomes part of the clinker product from the kiln. Thus, the chemistry of the waste is always important to the quality of the cement product or to kiln operation. Because of the set proportions or upper limits set for each element or compound in raw material, use of waste to supply a portion of raw material must be carefully monitored and limited. The prior art has recognized the desirability of a constant and uniform chemistry input into the kiln (see e.g. U.S. Pat. No. 5,454,333—von Seebach et al., U.S. Pat. No. 5,224,433—Benoit et al.). However, the prior art has not effectively treated the above discussed problems of using wastes, and has either produced a product with varying composition, or only been able to burn relatively low proportions of waste, or has required ongoing readjustments of the raw mix chemistry.

Another difficulty with the use of waste-derived fuel having a significant ash content is that, in many cases, the ash of an available waste contains materials that are not needed or are actually detrimental to the composition of total raw materials contributing to the cement clinker. In that case, the use of the waste fuel is severely limited. An example is the presence of a large amount of potassium or sodium in the waste. Potassium is detrimental in cement, so that the amount of waste containing potassium or sodium that can be tolerated is limited, and thus the prior art methods cannot economically use such a waste.

Another difficulty with the use of waste-derived fuel is the physical state of the waste. Many wastes from industrial processes are the result of water treatment programs whereby contaminants have been removed from the water, concentrated, and collected as sludge. Sludges commonly have a high water content and are difficult to use as fuel, or have no net heating value because of the contained water that must first be evaporated. The use of wet sludges in cement kilns is not easy, is not energy efficient, and thus is not economical for the cement plant. Another problem with the physical state of some wastes is the size of the waste components. If large pieces of waste are fed to a kiln, non-uniform burn characteristics and non-uniform chemistry result. Furthermore, non-uniform wastes must typically be introduced at mid-kiln and cannot be handled by conventional fuel handling and burning equipment. Many wastes have variable size and are not easily reduced in size because of their water content.

A further problem that must be addressed is the emission of pollutants in the flue gases of cement kilns fueled according to the prior art. Flue gas exiting a cement manufacturing plant will contain products of combustion, including carbon dioxide, along with water vapor and other gases from drying and chemically altering the raw materials in the kiln. The major fuels used in cement making are coal, oil, natural gas, and wastes, whereby coal is the principal fuel in the industry worldwide. Since coal is predominantly carbon, which oxidizes during combustion to form carbon dioxide, the flue gases from coal fired kilns contain a substantial proportion of carbon dioxide as a combustion product. Furthermore, since the calcium component of the typical raw material mix is provided largely by calcium carbonate (e.g. from limestone), which is calcined to form calcium oxide while releasing carbon dioxide, the calcining process is also a major contributor of carbon dioxide in flue gas exiting most cement plants that use conventional raw materials. Cement plants are very large emitters of carbon dioxide because of this dual nature of carbon dioxide generation, i.e. from oxidation of carbon in the fuel, and from calcining of calcium carbonate in the raw materials.

Using waste materials in the raw mix or as fuel will also impact the flue gas emissions and process requirements, in view of the combustion and chemical process emissions and conditions associated with the particular components of the waste. For example, it is known that some chemical constituents including some hazardous materials contained in wastes will volatilize and be swept out in the flue gas. Furthermore, H. F. W. Taylor ("Cement Chemistry", Academic Press, Inc., San Diego, Calif. 92101, 1990, ISBN 0-12-683900-X) has noted that energy can be saved in the cement making process if a part of the calcium component of the raw mix is provided by a material such as blast furnace slag that does not require decarbonation. However, the prior art has not suggested to purposely mix and use waste materials with particular compositions to actively reduce $CO_2$ emissions.

OBJECTS OF THE INVENTION

In view of the above it is the aim of the invention to achieve the following objects singly or in combination:

- to provide a waste-derived fuel that has a purposely designed composition such that the fuel has a desired fuel value and a desired composition of the noncombustible ash residue, which are homogenous and uniform over time and quantity;
- to provide a waste-derived fuel that is especially suitable for use in high temperature kilns, wherein the ash residue from combustion of the fuel is mixed with the raw material being processed, and the specifically designed composition of the ash is such that it provides a raw material or chemical benefit or otherwise influences the process and the resultant product being produced;
- to provide a waste-derived fuel that is custom-designed and prepared to have a composition that will provide an ash residue having a specific chemical composition as required by a particular consumer of the fuel;
- to provide a waste-derived fuel that is suitable for use as a supplemental fuel or as a primary fuel in a kiln such as a cement kiln, and that can be used instead of conventional fuels or mixed with or added to conventional fuels and burned in the same locations within a kiln system where conventional fuels are typically burned, for example in the main kiln burner and in the pre-heater/pre-calciner burners;
- to provide a waste-derived fuel that can be burned in conventional burner equipment without modifications or with only minor modifications;
- to provide a waste-derived fuel that provides significant fuel energy, providing at least 5,500 BTU/lb., but preferably at least 7,000 to 9,000 BTU/lb., and having an ash component of as much as 50% by weight, but preferably in the range of 15 to 30% ash content by weight;
- to provide a method of preparing such a waste-derived fuel that can use a broad range of different types of waste as the starting material, and especially can use different waste materials that happen to be readily available at any given time, and can use wastes that are conventionally too variable in composition or availability, or contain too high levels of undesirable components for use as a fuel, and yet can provide a relatively constant supply of a fuel product that has a uniform or standardized fuel value and ash composition as required by any particular user of the fuel;

to conserve landfill space in an environmentally and economically sound fuel combustion process, such as cement making, and to replace and conserve coal, oil, or other fossil fuels that would otherwise be burned;

to reduce costs of waste disposal and of providing a fuel supply, and to generate tipping fee and fuel sale income for a waste-derived fuel processor;

to reduce the emission of carbon dioxide from cement kilns and other industrial burners by providing waste-derived fuel that has a lower carbon content per unit fuel value as compared to coal fuels; and to reduce the emission of carbon dioxide from cement kilns or industrial firing processes in which ash is chemically involved in the industrial process, by providing a waste-derived fuel that has a lower proportion of calcium carbonate or other carbonate containing minerals as compared to the conventional or usual raw material used in the process.

SUMMARY OF THE INVENTION

The above objects have been achieved by the present invention which provides a waste-derived fuel having a managed or designed composition of an ash residue, especially for fueling cement kilns, a method for preparing such a fuel, and a method of reducing carbon dioxide emissions especially from cement kilns.

The invention is based on particularly formulating the chemical composition of a fuel by blending proper proportions of a plurality of different selected wastes, so that the fuel has a desired fuel value (e.g. minimum BTU/lb.) and a desired ash composition.

According to the invention, the specific composition of the fuel may be designed:

1) so that the ash composition is an approximation of the composition of normal raw material or process material less at least some of Ignition Loss (see e.g. Table 2, "Typical Raw Mix Composition for Cement Manufacture" below), and preferably the ash composition at least approximates the relative proportional content of the primarily significant elements Si, Al, Fe and Ca present in the normal raw material mix;

2) so that the ash composition is different from raw material or process material but contains a specific compound or compounds, for example iron oxide or silica, that are desired in the raw material mix, or process chemicals that are otherwise more expensive when not derived from waste, and preferably contains a higher proportion of such specific compound than is present in the normal raw material mix (see iron oxide in Example I, and Table 3 "Coal Fly Ash and Lime Waste" below);

3) so that the ash composition is different from raw material or process material in that it contains less than a typical or desired proportional amount of a compound, for example silica or calcia, that may be inexpensively added to the raw material by the cement plant or other process material preparation system, while it contains other essential materials to contribute to the raw material mix (see CaO in Example II and Table 4);

4) so that it includes calcium compounds other than carbonate minerals, as at least a part of the total calcium compounds provided in the mix, with a lower proportion of carbonates than are typically present in the raw material;

5) so that it includes a lower proportion of carbon per unit fuel value than a coal fuel that is being replaced.

One embodiment of the invention relating to cement kilns includes a first step of obtaining a plurality of different waste materials including, but not limited to, paper making sludge from paper mill waste water treatment plants; lime waste and "dregs", "grits", or "screenings" from paper mill lime regeneration systems; municipal sludge from municipal waste water treatment plants; petroleum waste containing sludges; fly ash, which may contain carbon, from utility and other boilers using coal or oil as fuel; sawdust; sander dust; wood waste such as waste from the wood products industry; plastic waste from a variety of manufacturing plants; other wastes containing at least a portion of organic matter capable of being burned; and other wastes containing little or no organic matter but containing chemical constituents, such as silica, calcia, alumina, and/or iron oxide, as necessary to modify or design the ash content or composition as required. Tables 3 and 4 provide examples of some types of waste that might be included in a mix of wastes, and the effect of blending those wastes to form a fuel.

After obtaining a variety of wastes having a variety of different compositions, the wastes are dried, if necessary; transported, if necessary, to a processing site; and ground, if necessary, to reduce the particle size to a size acceptable to the cement kiln user of the fuel produced thereby.

According to a key feature of the invention, the various waste input materials are chemically analyzed and then blended together as required, based on the chemical analyses, to prepare the final fuel composition. The chemical analysis determines the chemical composition and fuel value of each available type of waste, and the blending is carried out to best match the fuel user's requirements for ash composition and fuel value in the final blended fuel product. Some wastes may be blended or mixed before the drying step. After drying, the wastes may be blended before or after size reduction, in order to produce a desired fuel value and ash chemistry. The fuel may then, if desired, be formed into pellets or other larger agglomerates, as desired, to facilitate handling and control of airborne particulate matter. The prepared fuel may then be conveyed to a user cement plant. Chemical analysis can again be carried out on the final fuel for quality control and to assure uniformity.

Storage of wastes will be necessary at the site where the waste is generated, at the waste processing site before blending, at the fuel processing site after blending and before shipment of the finished fuel to a cement plant. Large volume storage at each stage will provide for increased uniformity of each waste material or of the resulting fuel by homogenizing or time-averaging any changes in combustibles content or ash chemistry that occur over time. Such homogenizing is especially achieved when mixing is carried out in each large volume storage container, or if particular ones among a large number of smaller storage containers are selected for further processing in random order. This will allow production of a more constant composition of the final blended fuel and will increase the utility of the fuel to cement manufacturers.

The present waste-derived fuel is processed and prepared so that it can be used in any of various manners as specified by the fuel user, such as a cement kiln. As explained above, the fuel is formulated and then ground and possibly pelletized to form a fuel product that can be readily used in the fuel users' ordinary fuel delivery system without requiring any modification or without extensive modification. For example, the particulate fuel or pelletized fuel can be used instead of or mixed with conventional crushed coal fuel that is either used as-is or further processed by the ultimate consumer of the fuel. In this case, the particulate fuel is fed into the furnace or kiln using the ordinary coal feeding and firing equipment. Alternatively, the particulate waste-derived fuel can be mixed with conventional oil fuel to form a suspension or slurry of the waste-derived fuel in the oil, which is then injected into the furnace or kiln by conventional oil injectors and firing nozzles, which may simply require a minor modification of the injector size. The present waste-derived fuel is particularly prepared according to the requirements of the fuel consumer, so that the waste-derived fuel can be used as a primary fuel or additive to the primary fuel for firing the main kiln burner or any other primary furnace burner, or for firing a pre-heater/pre-calciner burner, or to be injected into the kiln at a mid-kiln location as a supplemental fuel.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

The following description explains the steps that may be included in processing wastes into fuel according to the invention. The order of these steps is not limited. For example, waste may be dried before or after it is transported from its site of origin to a processing or use site. Generally it will cost less to transport materials after they have been dried, so that such a relative sequence of these steps is preferred. Wastes may also be blended to effect a new composition before or after drying or grinding. The particular order of steps used for a given application will depend on the wastes being used and on the potential handling and/or cost advantages obtained by a specific order of processing steps.

Figure 1A:
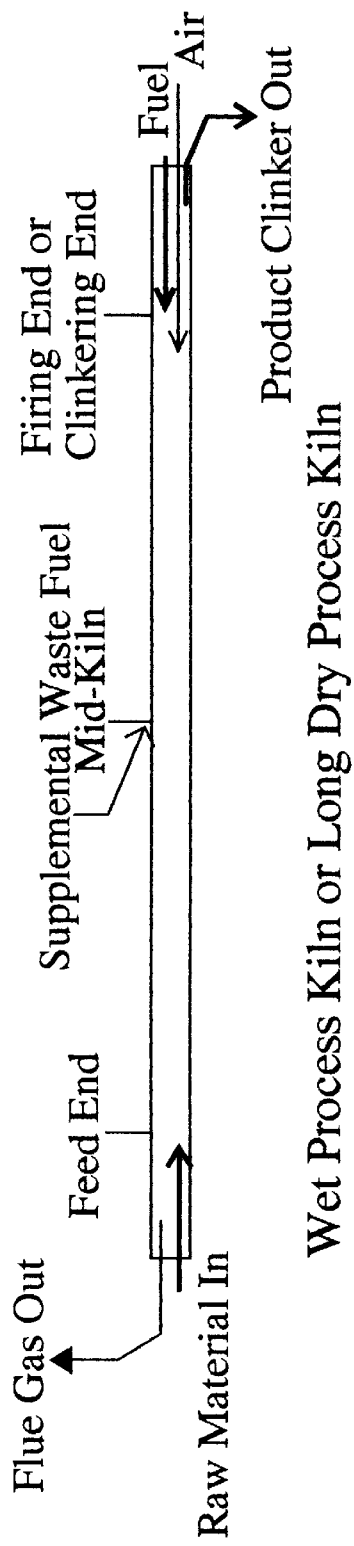
FIG. 1A is a schematic diagram showing a generally known configuration of a wet or long dry process cement kiln.
Figure 1B:
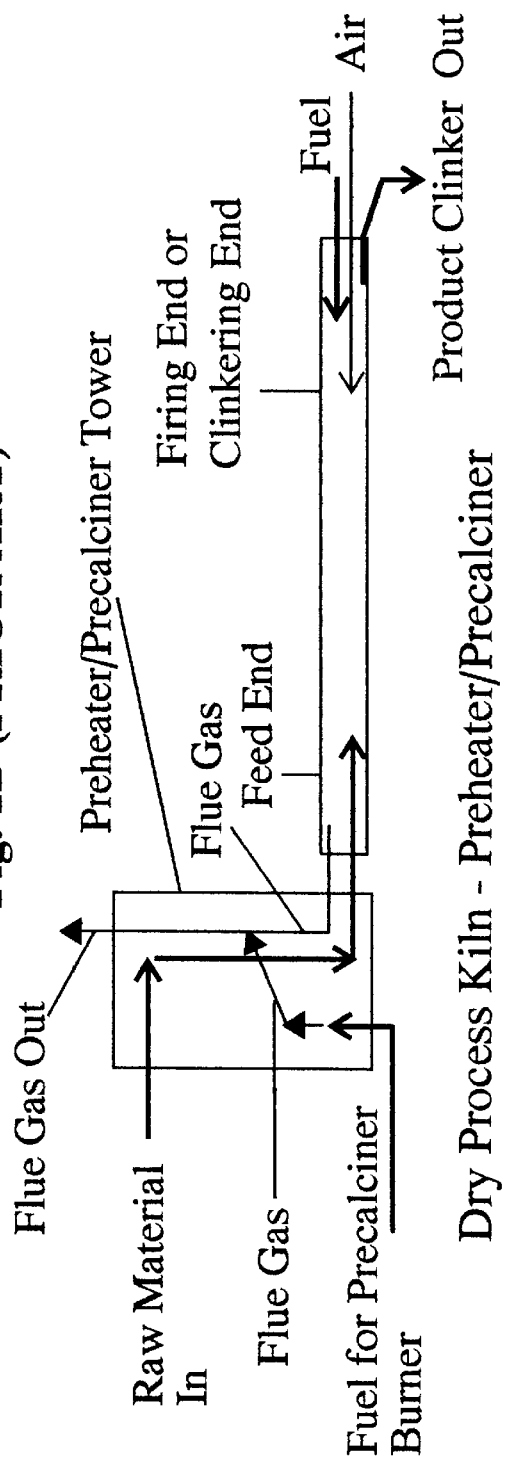
FIG. 1B is a schematic diagram showing a generally known configuration of a short dry process cement kiln including a pre-heater/pre-calciner.
Figure 2:
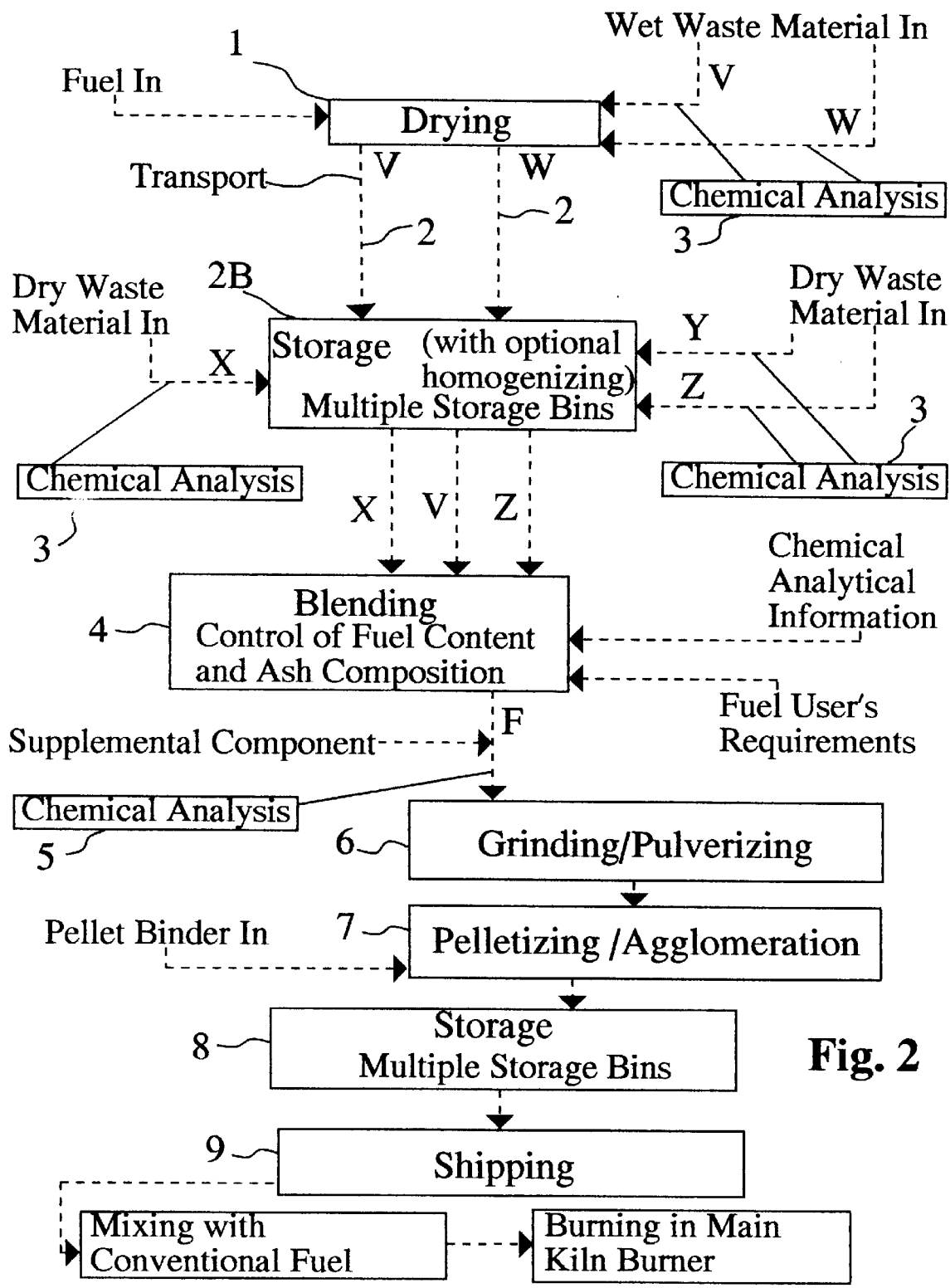
FIG. 2 is a flow diagram showing an example sequence of steps according to the invention for processing waste materials to prepare a fuel suitable for use in a cement kiln.

A generally preferred exemplary order of processing steps is shown in FIG. 2. The illustrated process will now be generally described with reference to FIG. 2, while the details of each step will be described below.

Step 1 involves drying two different example wet waste materials V and W at their source, if economically practical.

Step 2 involves transporting the dried waste materials V and W to the waste processing (fuel production) site. Step 2B involves obtaining three additional dry waste materials X, Y and Z, and then storing the separate waste materials on-site. The storage may optionally involve mixing or homogenizing of batches of the stored wastes to help maintain the constancy and uniformity of the composition of each waste.

Step 3 involves chemically and physically analyzing each waste material to determine its chemical composition, fuel value, physical properties, etc., or obtaining previously prepared chemical analyses of the waste materials.

Step 4 involves considering the chemical analytical information in comparison to data of a fuel user's requirements, and accordingly selecting and blending together appropriate proportions of the selected wastes X, V and Z to produce a blended fuel F that most optimally matches the fuel user's requirements with the available waste materials.

Step 5 involves chemically and physically analyzing the blended fuel F to assure fuel and ash quality and uniformity over time and volume, and if necessary adding a supplemental component that may be waste- or non-waste-derived, and may be combustible or non-combustible, to ensure that the fuel F has the required fuel and ash composition.

Step 6 involves grinding/pulverizing the blended fuel F.

Step 7 involves pelletizing the blended fuel F.

Step 8 involves storing the prepared fuel F.

Step 9 involves shipping the prepared fuel, and ultimately (optionally) mixing the waste-derived fuel F with a conventional fuel and then burning the mixture in a main kiln burner and/or a pre-calciner burner.

Detailed aspects of the several steps will be described in the following.

Waste Characterization

Several different analytical methods may be used to analyze the waste materials. Typically in prior art waste management, the analytical methods applied and the parameters measured have been unique to the needs of the waste generator or to the regulatory requirements specific to the waste being disposed. Therefore, a total or even a uniform chemical and physical analysis has generally not been conducted, i.e. many physical properties or chemical constituents of wastes are typically not measured. For example, silica is frequently not determined in waste sludge material that will be placed in a landfill, because silica is generally not hazardous or leachable in that condition. According to the invention, however, the chemical and physical properties that are significant to a user of waste-derived fuel must be assessed and taken into account. Therefore, it is useful to establish a protocol for analyzing wastes according to this invention.

Waste sources or generators are initially evaluated on the basis of usual expected waste composition (including fuel value, chemical constituents, ash content and composition, physical characteristics, and water content), quantity of the waste available from the waste source, constancy of the waste supply quantity and composition over time, location of the waste source, economy of transporting the waste from the waste source, and other factors that will affect the efficacy and practicality of using the respective waste as an ingredient in fuel.

The waste materials themselves are then physically and chemically analyzed on an ongoing or repeated basis. Most waste materials are analyzed according to one or more of the following, although each waste material is independently evaluated by whatever means is appropriate or required for the particular fuel to be produced:

1. Measure water content, e.g. by gravimetric analysis.

2. Measure fuel value or energy content and ash content, e.g. by ashing, calorimetry, gravimetric analysis.

3. Measure fuel and ash chemical composition, e.g. by atomic absorption, X-ray fluorescence, UV-Visible-IR spectrophotometry, wet chemical analysis, and other techniques as appropriate.

Each waste material is evaluated to determine the overall contribution it could make to production of a quality fuel.

The evaluation will determine whether and how much of the waste material should be included in a mix of wastes. Undesirable wastes need not be included in the fuel, or are included in such small or diluted proportions that they do not significantly affect the fuel quality, while still disposing of the waste over time. The waste materials are ranked or categorized according to those properties that make each waste material attractive for use in fuel. For example, a waste material will be used in the fuel if it provides an advantageous energy value or a particularly needed or desired chemical compound.

Examples of undesirable compounds include potassium, sodium, chloride, and many metals thought to be toxic in large quantity, including lead, cadmium, mercury, and selenium. Other undesirable qualities include a very high water content and therefore a high a drying cost, or a very low fuel value. On the other hand, examples of desirable compounds include calcium oxide or calcium carbonate, silica, alumina, and iron oxide. In many cases it is desirable that the iron oxide content of the fuel ash be higher than the iron oxide concentration in normal raw material for the process (e.g. cement raw mix) because iron oxide usually is a purchased ingredient for addition to the raw material, so that replacing purchased iron oxide by lower cost fuel-ash-derived iron oxide provides a cost savings.

Properties and composition should be determined and expressed as follows. Water content may be expressed in a variety of forms including % water in bulk waste, or as pounds of water per pound of waste (or kg/kg), or pounds of water per ton of waste (or kg/ton), or as a percent of dry weight. Solids content may be expressed as percent solids in waste, or pounds of solids per pound of waste (or kg/kg), or pounds of solids per ton of waste (or kg/ton). Analysis on a dry weight basis preferably should include: combustibles content or organic content as difference between mass of dry solid and mass of ash after complete combustion; ash content as a percent of dry weight; BTU/lb. of dry solid (or MJ/kg); % sulfur; % carbon; and total N, Kjeldahl N, ammonia N, and nitrate N. Ash analysis by appropriate method should provide either element, compound, or oxide determination expressed as oxide % where appropriate for: $SiO_2$; $Al_2O_3$; CaO; MgO; $Fe_2O_3$; $K_2O$; $Na_2O$; $P_2O_5$; $TiO_2$; ZnO; $Cl^-$; $SO_4^-$; and Ignition Loss. Note that Ignition Loss (Loss on Ignition) is loss of volatiles including carbon dioxide and water, and loss of combustibles, that will occur when the sample is heated (ignited). More particularly, in discussing the present processed fuel and the ash therein, "Loss on Ignition" refers to two types of "loss": first, loss from combustion of the combustible components of the fuel; and secondly, loss of volatiles from the inorganic ash reside portion of the fuel upon further heating thereof, which is, for example, similar to calcining in a cement kiln. In most cement kiln raw material situations, Ignition Loss refers principally to inorganic carbon dioxide released on heating of limestone. Further, elemental analysis should be conducted to express the element in mg/kg for: As; B; Ba; Cd; Co; Cr; Cu; Hg; Mn; Mo; Ni; Pb; Se; Te; Tl; and V.

Other elements may be added to the preceding list as required to meet regulatory requirements or cement specifications in a particular situation. Alternatively, it is not absolutely necessary to determine each of the above analytical values, if it will not be pertinent to the requirements of a particular fuel blend.

The above characterization may be accomplished by use of materials and equipment found in an ordinary well equipped chemical analytical laboratory, and will be readily understood to be carried out by a chemist skilled in the art. Data determined from this characterization are then entered into a data base for use in designing fuel compositions. Conventional computer data base and variable optimization software may be used to manipulate the data and determine an optimum blended fuel composition to meet requirements at any time using available waste material.

Waste Drying

Most waste materials are dried for use in the fuel. As discussed above, the drying may occur before or after blending, grinding, or transport. Drying is accomplished using conventional drying equipment suitable to the waste being used. Drying is accomplished by thermal means and assisted by vacuum if desirable. Energy for the drying step is obtained from waste-derived fuel, fossil fuel, waste oil, so-called "specification oil" recovered from oil spills and the like, where applicable waste heat from an industrial process, solar energy, electrical energy or other sources, as appropriate. Drying may also be passive, i.e., materials can be allowed to air dry without additional heating. Preferably, the energy for the drying step is provided by using as a fuel whatever waste is most readily available and most suitable at the time, e.g. a waste that is available in over-abundance or that has characteristics that make it unsuitable for use in the fuel product being produced.

A typical sludge waste initially has a water content of from 50% to 90% of the sludge. Drying is carried out to reduce the water content of the prepared fuel to the level of about 3% to about 8%, and preferably 5% to 6% water. Other wastes used for fuel production typically have an initial water content of zero to 30%, and undergo drying, if and to the extent necessary, to provide a mixed fuel product moisture content of 5% to 6%. Some types of waste to be used in particular fuels may not need to be dried. For example, a particular embodiment of a fuel according to the invention might use particulate solids of dry wastes blended into waste oil, so-called "specification oil", or other waste combustible liquids, or even conventional non-waste fuel oil, to provide a liquid or slurry fuel that is intended to be burned in conventional liquid or slurry fuel burners.

Waste Grinding

Waste must be reduced in size where necessary. Some wastes are in an acceptable size range with no grinding. Size reduction is accomplished using conventional commercially available industrial grinding equipment. The average size of fuel particles after grinding that is generally preferred is not greater than 1000 microns, more preferred is not greater than 500 microns, and especially preferred by most cement kiln operators is expected to be 95% of particles less than 50 mesh (approximately 300 microns) and including particles that are very much smaller. If a fuel user cement plant has no fuel grinding capability, the waste-derived fuel may be ground to 100 to 200 mesh size (75 to 150 microns). There is no absolute limit on the desirable size for particles in the fuel. The practical size for a given fuel blend is that size which can be effectively and economically used in the cement kiln, and it is expected that each kiln will have unique characteristics. The presently preferred particle size ranges specified above are intended for use in present conventional burners typically used in kilns.

The grinding requirement may vary depending on the user of the fuel, and each fuel user may be served by a fuel specifically prepared for its use. One cement plant, for example, may only require partial pre-grinding or no pre-grinding of the fuel because it will add the waste-derived fuel to an existing fuel preparation system in use at the cement plant and further grind it along with a conventional fuel. Another cement plant, for example, may desire to have the fuel in a pulverized state where particles are on the order of 100 to 200 mesh size (approximately 75 to 150 microns) so that the fuel may be directly injected into the cement kiln without additional grinding. Preferably, the fuel (and all waste materials included therein) is provided in a condition in which the cement plant can use the waste-derived fuel as a substitute for its conventional fuel, using all of the plant's ordinary fuel handling equipment.

Waste Blending

A number of different waste materials that have been dried, and possibly already ground, are selected, mixed and blended to produce a fuel that has a useful fuel value and an ash composition tailored to meet particular cement plant specifications. Different types of waste may also be pre-blended before transport to the fuel production facility, if such pre-blending will increase the utility or practicality of the blended waste. The specifications provided by the fuel user should include initial fuel composition, water content, combustibles content, fuel value, ash content, and ash composition. The specifications pertaining to the ash composition can be based on a comparison between ash composition and cement kiln raw material composition, and further can be based on the concentration of several elements or compounds that may have stated upper or lower limits of concentration. The fuel user's requirements may also be expressed as allowable ranges of components.

Blending of wastes is to be carried out by conventional blending and mixing equipment, wherein a number of different waste materials may be conveyed (conveyor belt, screw auger, etc.) from temporary storage containers to a mixer for combining certain waste materials in the desired proportions. Blending may be carried out in a batch process or in a continuous process in any manner that is known by persons of ordinary skill. The previously obtained chemical and physical analysis of each waste material, and the complete characterization of each waste material as explained above, are used to determine the proportion of each component of the mix.

Determination and control of the blending and proportioning may be carried out manually or by a computer. A computer program for calculating the best combination of wastes in a fuel product is preferably used. An example of a suitable program is the "Optimize" routine included in the commercially available spreadsheet/database program "Quattro Pro". This program allows factors relating to fuel and ash compositions, availability, transport distance and tipping fee to be considered in determining the optimum mix of wastes. Specific examples of waste blending are presented below.

Pelletizing

Prepared fuel, including wastes that have been dried, ground, and mixed or blended to form the desired chemical composition, is then preferably processed in one of two ways, although other ways of processing may arise from time to time. In one manner of processing, the next step is shipment as pulverized material for those cement plants having no grinding facilities but having the capability to burn finely divided materials. Such burners are known. In this case the maximum particle size will be in the range of 100 to 200 mesh (approximately 75 to 150 microns) rather than 50 mesh (approximately 300 microns).

In the second manner of processing, the next step is to form the pulverized or ground fuel into pellets of 1 millimeter to 10 or 20 millimeter size. These pellets may be formed in conventional pelletizer equipment, wherein fuel particles will be bound together with an added binder material, if necessary. The process step of pelletizing makes the pulverized fuel mass into a more easily handled fuel product and helps keep fugitive dust to a minimum. The binder may be any material that will help to form a pellet of the desired size, and that is capable of withstanding the handling and transport involved in conveying the fuel pellets from the fuel production plant to the fuel user. The binder also needs to be easily crushed or disaggregated when the fuel pellets are introduced into the cement plant fuel grinding system. Known binders such as salt, sugar, and other substances expressly prepared as binders can be used. However, it is preferred that the binder does not add undesirable chemicals to the blended fuel, as would be the case with salt. It is further preferred that the binder adds to the energy content of the fuel, and, if possible, that it consists of a waste material so as to provide an additional tipping fee income. The binder may preferably, for example, be composed of whey, a waste generated by the processing of milk products, or ligno sulfonates, a waste generated by preparing paper pulp from trees by the Kraft process. Other wastes suitable for use as a binder will be available from time to time.

Storage

Waste is stored as necessary in the various stages of transport and processing. There may be interim storage of individual waste materials at any waste generator site or at the fuel processing plant to accommodate waste production and delivery schedules of the various waste generators. Storage of finished fuel is kept to a minimum by on-demand or just-in-time processing of the fuel and continuous shipment to users. Storage at each stage assists in maintaining a homogenous and uniform fuel by helping to average, over time, the small variations in composition that occur during waste generation. This is especially true when mixing is provided in each storage container, or if a plurality of small storage containers are randomized in order before use.

Waste Transport

Waste materials are transported from the waste generator to the fuel processing site. The waste is preferably transported when it is dry, but wet materials may also be transported if that is economically more practical. Transport is carried out in closed or covered conveyance whenever possible, and is by conventional means which may include truck, rail, or barge as appropriate.

Final Use of Waste-Derived Fuel

The present waste-derived fuel may be used in normal kiln solid fuel preparation systems. Coal grinding mills will accept this fuel when mixed with conventionally used coal or coke. The fuel may be used in the normal kiln main burner in a wet process kiln or a long dry process kiln. In a dry process kiln the present fuel may be used in the kiln main burner or at the pre-heater/pre-calciner burner with other solid fuel. The present waste-derived fuel is preferably to be used to replace at least 5% (particularly on a fuel value basis) of a conventional fuel in a mixture therewith, for example in a range from 5 to less than 50%, or especially 10 to 35%. If desired, the present fuel can be used to replace more than 50%, or even more than 70%, and especially more than 90% and up to 100% of a conventional fuel. This material may also be introduced at a mid-kiln port at which it is conventionally known to introduce certain hazardous wastes or tires, if desired.

Many cement plants produce more than one type of cement. Commonly Type I cement and Type II cement may be produced at the same plant. Because these cement Types have different compositions, they require different raw material compositions. The present waste-derived fuel can be manufactured, by adjustments in the blending of wastes, to meet production requirements for these different types of cement.

Other possible uses of this fuel exist. In any situation where both fuel and process materials or other chemicals are used in conjunction, for example steel making or preparation of asphalt paving materials, the present fuel can be blended and otherwise prepared to achieve a specific required fuel value and ash composition, and thus can at least partially replace other fuels and chemical materials to provide both economic and environmental advantage. More generally, the present fuel can be prepared for use in any furnace or other industrial burner, even in situations where the ash composition is not important to the process being carried out.

The present fuel can also be specifically prepared so as to reduce the emission of carbon dioxide during the cement manufacturing process. For this application, the fuel should be formulated to have a minimized content of calcium carbonate. Instead, calcium in the fuel should be in the form of oxides, hydroxides, phosphates, sulfates, sulfites, hydrates of sulfates or sulfites, or silicates of calcium. Further, the fuel should have a reduced amount of carbon per unit fuel value as compared to coal, for example the fuel should contain carbon making up not more than 90%, especially not more than 90% of the combustibles of the fuel. When such a fuel is used to replace conventional coal fuel and some of the conventional limestone calcium carbonate raw material used in a cement kiln, the emission of carbon dioxide is reduced in two ways. First, there is a reduced need of decarbonization or calcining of a limestone raw material, with a resultant decrease in the amount of released $CO_2$. Secondly, when the present fuel is burned, the combustion products include water vapor in addition to carbon dioxide, with a resultant reduced amount of carbon dioxide when compared to the combustion of coal. An example of a fuel blend for such an application is discussed below.

Examples of Waste Blending and Mixing

It is an important feature of the invention to select from among, and blend together, a variety of wastes having different compositions. A great number of different possible waste materials may enter into the fuel production process, so that it is not possible to describe all possible mixtures herein. However, the following description provides two examples of mixing or blending different wastes to produce a specific fuel value and ash composition according to the invention. Several other example blends as may be required can readily be determined from the waste compositional data presented in Tables 4A, 4B and 4C, using the above-mentioned optimizing software.

For both of the following examples it is instructive to compare the composition of normal raw material used for making cement with the composition of ash developed in the prepared fuels. The following Table 2 showing normal raw material mix is intended to be a generic example, and does not necessarily correspond to any particular cement plant raw material mix. Similarly, the wastes described in Examples I and II are examples only, representing expected average compositions for the stated types of waste, and not necessarily representing any particular waste generator. Other wastes could be added or substituted and the proportions of those additional wastes, or the wastes shown, could be increased or decreased to produce the desired fuel value and ash composition.

TABLE 2

Typical Raw Mix Composition for Cement Manufacture

| Oxide | Percent Content |
| --- | --- |
| $SiO_2$ | 14. |
| $Al_2O_3$ | 3.6 |
| $Fe_2O_3$ | 2. |
| CaO | 42. |
| MgO | <4. |
| $K_2O$ | <1. |
| $Na_2O$ | <0.7 |
| $SO_4$ | <3.5 |
| Ignition Loss | 33.5 |

Example I

One example mix of materials includes one part carbon bearing fly ash from a coal fired utility boiler combined with six parts waste (dregs/slaker grits) from a paper manufacturing plant lime regeneration process. Table 3 gives the composition of each waste as calculated for the initial state including carbon and as recalculated for the state after burning off the carbon, and of the ash composition of the mixture. Note that "Ignition Loss" in Table 3 refers principally to loss of carbon dioxide from the inorganic portion of the fuel, and not to loss by combustion of the carbon portion of the waste.

If the mixed, carbon-free ash composition material is compared to the raw mix shown in Table 2, it is seen that the silica content of the fuel ash is somewhat lower than desired for matching the raw mix composition. The alumina content is slightly high. Calcia content is slightly high, and therefore, the mixed fuel will accommodate addition of some silica (e.g. derived from sand) without reducing the proportionate content of calcia to levels too low to be useful as raw material. MgO is well below the upper limit and provides a means to accommodate other wastes that may contain excess magnesium. Iron oxide is moderately low, but probably not so low as to require addition of an iron bearing compound to the mix. Sodium is higher than desired, but can be reduced by the further addition of silica, and may be acceptable in light of the low potassium content. Sulfur (sulfate) is very low and leaves room for addition of other wastes that may contain sulfur compounds. Other ingredients may also be added, for example wood waste which is low in ash content, to increase the fuel value of the mix, or further adjust the composition of the ash.

In general, there is a good correspondence between the ash of the waste-derived fuel and typical raw mix. Addition of silica to increase the proportion of silica closer to 14% would bring most components to within acceptable limits. Furthermore, it may not even be necessary to adjust the silica content for the following reason. Since the present waste-derived fuel may be used in a proportion below 50% of the total fuel input to the kiln and has an ash content of 20%, that level of substitution will account for only about 1% of the total mass of raw material entering the kiln. In that case, if silica in the fuel ash is low by the amount discussed above (14%–8.83%), then the impact on the contents of the kiln would be a reduction in total silica of only approximately 0.05%, and that is an acceptable impact.

TABLE 3

Coal Fly Ash and Lime Waste

|  | Utility Fly Ash | | Paper Mill Dregs/ Slaker Grits | | Mixed Wastes: 1 Part Fly Ash With 6 Parts Dregs/Slaker Grits |
|---|---|---|---|---|---|
|  | Carbon | No Carbon | Carbon | No Carbon | No Carbon (Ash) |
| $SiO_2$ | 47.18 | 58.98 | 0.42 | 0.49 | 8.83% |
| $Al_2O_3$ | 23.49 | 29.36 | 0.33 | 0.39 | 4.52 |
| CaO | 1.49 | 1.86 | 44.12 | 51.91 | 44.75 |
| MgO | 0.71 | 0.89 | 1.33 | 1.57 | 1.47 |
| $Fe_2O_3$ | 4.50 | 5.63 | 0.28 | 0.33 | 1.08 |
| $Na_2O$ | 0.26 | 0.32 | 3.3 | 3.89 | 3.38 |
| $K_2O$ | 1.75 | 2.18 | 0.11 | 0.13 | 0.42 |
| $SO_4^=$ | 0.62 | 0.78 | 0.47 | 0.55 | 0.58 |
| Carbon | 20.0 | — | 15.0 | 0.00 | 0.00 |
| Ignition Loss |  | — | 34.73 | 40.74 | 34.97 |

Note:
"Ignition Loss" refers principally to loss of carbon dioxide from the ash portion of the fuel as a result of calcining, and not to loss of carbon as a result of combustion.

Example II

A second example fuel according to the invention includes several wastes combined in proportions to provide an especially high fuel value. The fuel contains seven types of waste as shown in Tables 4A and 4B, which have the following characteristics and proportional amounts (in dry weight) on an annual basis:

Paper mill "A" sludge: 29,375 tons per year total, 9,000 BTU/lb. of combustible material, 14,087 tons per year of ash;

Generic mixed paper mills sludge (a mix of materials from several paper mills): 29,375 tons per year total, 9,000 BTU/lb. of combustible material, 14,087 tons per year of ash;

Lime waste mixture from several paper mills: 9490 tons per year total, 11,000 BTU/lb. of combustible material, 5,219 tons per year of ash;

Sludge mixture from municipal waste water treatment plants: 7138 tons per year total, 9,700 BTU/lb. of combustible material, 3,569 tons per year of ash;

Manufacturing facility waste "B" (sander dust from wood/resin composite article manufacturing): 2,300 tons per year total, 13,500 BTU/lb. of combustible material, 0.92 ton per year of ash;

Manufacturing facility waste "C" (spun fiber waste of polypropylene/polyester): 2,484 tons per year total, 13,500 BTU/lb. of combustible material, 0.92 ton per year of ash; and Wood waste, 50,000 tons per year total, 9,000 BTU/lb. of combustible material, 500 tons per year of ash.

The resulting mixed fuel has 24.05% ash content and 7,066 BTU/lb. Fuel value as shown in Table 4A. Note that each waste material may be obtained from a single source or several sources at any given time, and thus may be a single-source material or a mixed material at any given time. The material is further considered "mixed" (over time) for the present example if it is received from several sources or with a varying composition over the annualized basis.

TABLE 4A

DRY WASTE MIX

| Waste → Source | Paper Mill A | Paper Mills- Mixed Sludge | Lime Waste | Municipal Waste Water Treatment Plant Sludge | Factory B | Factory C | Waste Wood | Total or Weighted Average of Mixed Fuel |
|---|---|---|---|---|---|---|---|---|
| Tons of Dry Waste/Year | 29,375 | 29,375 | 9,490 | 7,138 | 2,300 | 2,484 | 50,000 | 130,162 |
| Percent Ash | 50 | 25 | 55 | 50 | 0.04 | 0.04 | 1 | 24.05 |
| BTU/lb. of Combustible Material | 9,000 | 9,000 | 11,000 | 9,700 | 13,500 | 13,500 | 9,000 | — |
| BTU/lb. of Fuel (Ash + Combustibles) | 4,500 | 6,750 | 4,950 | 4,850 | 12,960 | 12,960 | 8,910 | 7,066 |

TABLE 4B

ASH FROM WASTE COMBUSTION*

| Waste Source → | Paper Mill A | Paper Mills-Mixed Sludge | Lime Waste | Municipal Waste Water Treatment Plant Sludge | Factory B | Factory C | Waste Wood | Total or Weighted Average of Mixed Fuel |
|---|---|---|---|---|---|---|---|---|
| Tons of Ash/Year | 14,087 | 7,343 | 5,219 | 3,569 | 0.92 | 0.92 | 500 | 31,321 |
| $SiO_2$ | 20.47 | 21.97 | 0.00 | 40.76 | 51.00 | 41.29 | 7.55 | 19.1 |
| $Al_2O_3$ | 15.52 | 14.02 | 7.02 | 20.38 | 0.66 | 20.08 | 2.34 | 13.8 |
| CaO | 30.88 | 31.63 | 49.25 | 9.42 | 21.11 | 12.87 | 56.31 | 31.5 |
| $Fe_2O_3$ | 4.05 | 3.55 | 6.67 | 15.93 | 2.01 | 5.21 | 2.76 | 5.6 |
| MgO | 2.51 | 2.60 | 2.68 | 3.81 | 2.53 | 2.02 | 6.35 | 2.7 |
| $Na_2O$ | 2.61 | 2.01 | 0.28 | 0.82 | 2.28 | 0.05 | 3.89 | 1.9 |
| $K_2O$ | 0.20 | 0.32 | 0.93 | 0.91 | 7.89 | 0.04 | 8.85 | 0.6 |
| $SO_4$ | 0.62 | 0.54 | 0.98 | 0.21 | 2.99 | 0.46 | 7.87 | 0.6 |
| Loss On Ignition | 23.94 | 23.36 | 38.55 | 7.40 | 3.17 | 17.98 | 4.07 | 23.5 |
| Total | 100.80 | 100.00 | 100.00 | 99.64 | 100.00 | 100.00 | 100.00 | — |

*Each source listed represents an average of ash analyses for major elements, calculated as oxide percent and recalculated to approx. 100% to compensate for minor elements not listed. In practice compositions will vary due to difference in wood (tree) species, type of municipality (residential or industrial), or type of industrial process.

When compared to the typical raw mix composition in Table 2 above, the ash composition shown in Table 4B may be considered high in silica and alumina, or, conversely, it may be considered low in calcia. It should be evident from the present discussion that the composition shown in Table 4B can be adjusted in any manner desired by changing the proportional amount of any one or of each waste included, or by using other wastes where their compositions provide the desired benefit or change. For example, the silica and alumina content can be reduced, and the calcia content can be increased, if desired, for example by increasing the proportion of Lime Waste or Waste Wood. Alternatively, the silica and alumina content of the blended fuel can be readily reduced by decreasing the amount of Municipal Waste Water Treatment Plant Sludge in the mix. This would also have the effect of increasing the relative fuel value because the total quantity of ash in the fuel would decrease. If a higher fuel value is desired, wastes of the type "Factory B" or "Factory C" can be increased in total proportion of the mix.

Alternatively, the composition can be adjusted by adding another source of calcia. If calcium carbonate is added to the fuel mix in an amount designed to raise the total ash CaO content to 42%, for example, the other ash constituents are diluted and the resulting ash will have a slightly different composition more closely approximating typical cement kiln raw material. It is difficult to accurately predict specific cement kiln raw material requirements, because each kiln will have somewhat different requirements depending on the mix of sand, limestone, shale, iron oxide, etc. making up the raw feed. Table 4C shows an ash composition that has been adjusted by the addition of calcium carbonate, and recalculated to provide the oxide analysis in the right column of Table 4C, assuming as an example a raw mix in which CaO is 42% of the total, or the cement kiln operator has requested an ash composition with 42% CaO. In Table 4C, 2,533 tons of calcium carbonate has been calculated to be added to the ash of Table 4B, bringing the total mass of ash up to 33,854 tons. More specifically, addition of 2,533.32 tons of $CaCO_3$ or 1,358.47 tons of CaO, (equivalent to approximately 0.14% of raw material input if fuel production is distributed to three cement plants each producing approximately 500,000 tons of cement per year) will result in the adjusted analysis shown in Table 4C, where CaO has been increased to 42%.

TABLE 4C

| | Ash Composition of Mixed Fuel (from Table 4B) | Modified Analysis with Added $CaCO_3$ |
|---|---|---|
| Tons of Ash/Year | 31,321 | 33,854 |
| $SiO_2$ | 19.1 | 16.4 |
| $Al_2O_3$ | 13.8 | 11.8 |
| CaO | 31.5 | 42.0 |
| $Fe_2O_3$ | 5.6 | 4.8 |
| MgO | 2.7 | 2.3 |
| $Na_2O$ | 1.9 | 1.6 |
| $K_2O$ | 0.6 | 0.5 |
| $SO_4$ | 0.6 | 0.5 |
| Loss On Ignition | 23.5 | 20.1 |

In the resulting composition in Table 4C, the match between adjusted ash composition and ordinary raw material (as shown above) is good. Silica and alumina are high. Iron oxide is high, adding material that would in most cases otherwise be purchased. Na is slightly higher than desired, but acceptable in light of the low $K_2O$ content. MgO is lower than required, allowing for the addition of other sources of Mg. $SO_4$ is low, and could allow for the addition of other waste sources, for example gypsum from scrubber sludge, as a calcium source.

It should further be understood that the supplemental calcium carbonate for the adjustment in Table 4C need not be added to the fuel itself, but instead can be added to the raw material mix being fed into the kiln. The overall result in product chemistry is the same in either case. If the above adjustment to composition is made by addition of limestone to the raw material at the cement plant, using the normal limestone supply system, the increased use of limestone would be only 0.14% of normal raw feed mass and is of negligible significance.

One of the potentially most important differences between the composition of ash from this fuel and the composition of normal raw material is the comparatively low "loss on ignition". "Loss" in cement kiln raw material analyses is typically the measure of $CO_2$ that is released from limestone (calcium carbonate) as it is calcined within the kiln. The loss on ignition for the present fuel is lower than that of cement kiln raw material, because calcium is present in silicate minerals or as the oxide rather than in carbonate minerals (as in limestone raw material). In this context, it is especially preferred that the compositional adjustment addressed above in conjunction with Table 4C is carried out by adding a calcium source other than calcium carbonate.

Since the calcium provided by the ash supplants an equivalent amount of calcium that would otherwise be provided by limestone (calcium carbonate) raw material, the quantity of carbon dioxide released into the atmosphere during the manufacture of cement can be substantially reduced by using a waste-derived fuel containing calcium compounds where carbonate or $CO_2^=$ is not the major anion, for example calcium silicates, calcium hydroxide, calcium sulfate, calcium sulfite, hydrates of at least one of calcium sulfate and calcium sulfite, calcium oxide or calcium phosphate. This reduction in $CO_2$ emission is considered to be important because of the relationship between atmospheric carbon dioxide, the so-called "greenhouse effect" and global warming. In the above example in which a cement plant would use 50,000 tons of the present waste-derived fuel per year, the reduction in emission of carbon dioxide from the calcining process alone is expected to be 5,000 tons of $CO_2$ per year. There will be an additional reduction in $CO_2$ emission from the combustion process when the present fuel is burned instead of coal, because of the hydrogen content of this fuel (compared to coal) and the consequent production of water rather than carbon dioxide during combustion. In view of the above, a preferred fuel has a chemical composition providing an ash composition having an element oxide analysis including $SiO_2$ in a range from about 7 to about 18 percent, $Al_2O_3$ in a range from about 2 to about 7 percent, $Fe_2O_3$ in a range from about 1 to about 10 percent, CaO in a range from about 20 to about 52 percent, and having not more than 10 percent of MgO, not more than 5 percent of total $Na_2O+(0.685)\times(K_2O)$, and not more than 11 percent of $SO_4$. More preferably, the ash composition has the $SiO_2$ being in a range from about 10 to about 15 percent, the $Al_2O_3$ being in a range from about 2 to about 4 percent, the $Fe_2O_3$ being in a range from about 2 to about 7 percent, the CaO being in a range from about 35 to about 46 percent, and having not more than 6 percent of MgO, not more than 3 percent of total $Na_2O+(0.685)\times(K_2O)$, and not more than 7 percent of $SO_4$. A preferred fuel is made up of a mixture of waste materials including paper mill sludge solids in a range from about 40 to about 50 dry weight percent, paper mill lime waste in a range from about 6 to about 10 dry weight percent, municipal waste water treatment sludge in a range from about 0 to about 8 dry weight percent, and wood waste in a range from about 20 to about 45 dry weight percent. The preferred fuel may further include manufacturing wastes containing plastic, in a range from more than 0 to about 15 dry weight percent.

Although the invention has been described with reference to specific example embodiments it will be appreciated that it is intended to cover all modifications and equivalents within the scope of the appended claims.

What is claimed is:

1. A method of producing and handling a fuel, comprising the following steps:
   a) obtaining at least a first waste material and a second waste material that respectively have different chemical compositions and that are respectively selected from the group of waste materials consisting of paper mill sludge, paper mill lime waste, municipal waste water treatment sludge, wood waste, paper waste, plastic-containing manufacturing waste, fly ash, petroleum-containing sludge, organic agricultural wastes, rubber-containing waste, inorganic mineral-containing waste, and combinations thereof;
   b) obtaining respective chemical composition information for each of said first waste material and said second waste material;
   c) specifying a required ash chemical composition of said fuel to be produced; and
   d) preparing said fuel, comprising mixing together at least a first proportion of said first waste material and a second proportion of said second waste material, wherein said proportions are each selected dependent upon said chemical composition information so that said fuel has an energy value of at least 5500 BTU/lb. and an actual chemical composition of an ash residue of said fuel that corresponds to said required chemical composition.

2. The method of claim 1, wherein said step c) comprises obtaining required chemical composition data from a prospective consumer of said fuel, wherein said data relate at least to an ash percentage content, an ash composition and an energy value of said fuel.

3. The method of claim 2, wherein said prospective consumer of said fuel is a cement kiln facility.

4. The method of claim 1, wherein said step d) is carried out such that said actual chemical composition of said ash residue of said fuel provides an ash composition having an element oxide analysis including $SiO_2$ in a range from 7 to 18 percent, $Al_2O_3$ in a range from 2 to 7 percent, $Fe_2O_3$ in a range from 1 to 10 percent, and CaO in a range from 20 to 52 percent.

5. The method of claim 1, wherein said step d) is carried out such that said actual chemical composition of said ash residue of said fuel provides an ash composition having an element oxide analysis including at least one of $SiO_2$ in a proportion greater than 13 percent, $Fe_2O_3$ in a proportion greater than 2 percent, and $Al_2O_3$ in a proportion greater than 3.3%.

6. The method of claim 1, wherein said step d) is carried out such that said actual chemical composition of said ash residue of said fuel provides an ash composition that includes a proportion of calcium carbonate with an equivalent element oxide analysis of less than 42% of CaO.

7. The method of claim 1, wherein at least one of said first and second waste materials includes said paper mill sludge and said paper mill lime waste.

8. The method of claim 1, wherein said step a) further comprises obtaining at least third, fourth and fifth waste materials respectively selected from said group of waste materials, with said waste materials each having different compositions, and wherein said step d) further comprises mixing together with said first and second waste materials at least a third proportion of a selected one of said third, fourth and fifth waste materials.

9. The method of claim 1, wherein said step b) comprises carrying out a respective chemical analysis on a respective sample of each of said waste materials.

10. The method of claim 1, wherein said chemical composition information obtained in said step b) includes percentage content values for constituents including at least $SiO_2$, $Al_2O_3$, CaO, MgO, $Fe_2O_3$, $Na_2O$, $K_2O$, and $SO_3$ when expressed as element oxides in an ash residue of said first and second waste materials.

11. The method of claim 1, wherein said step d) further comprises blending together said waste materials sufficiently so that all of said fuel has a substantially homogenous composition.

12. The method of claim 1, wherein said step d) is carried out as a batch process.

13. The method of claim 1, wherein said step d) is carried out as a continuous process.

14. The method of claim 1, further comprising a step of grinding said waste materials before or after said step d) to have an average particle size of not greater than 1000 microns.

15. The method of claim 14, wherein said average particle size is in a range from about 75 to about 150 microns.

16. The method of claim 1, further comprising a step of adding a binder to said mixed waste materials and forming pellets thereof after said step d), wherein said pellets have a size of about 1 to about 20 millimeters.

17. The method of claim 16, wherein said pellets have a size of about 1 to about 10 millimeters.

18. The method of claim 1, further comprising a drying step including combusting at least one of said waste materials to provide heat energy, and using said heat energy for drying said fuel so that said fuel has a moisture content in a range from about 5% to about 6%.

19. The method of claim 1, further comprising a step of accumulating and storing said waste materials before said step d), and mixing each said waste material during said storing so as to homogenize each said waste material.

20. The method of claim 1, wherein said step d) further comprises adding at least one inorganic supplemental compound to said mixed waste materials so that said actual chemical composition of said ash of said fuel corresponds to said required chemical composition.

21. The method of claim 1, further comprising, after said step d), blending said fuel with coal.

22. The method of claim 1, further comprising, after said step d), introducing said fuel into at least one of a primary fuel burner of a cement kiln and a primary fuel burner of a cement pre-calciner.

23. The method of claim 1, wherein said steps a) and d) are carried out such that said fuel contains calcium in the form of at least one of calcium oxide, calcium silicate, calcium hydroxide, calcium sulfate, calcium sulfite, hydrates of at least one of calcium sulfate and calcium sulfite, and calcium phosphate, contains carbon making up not more than 90% of a combustible portion of said fuel, and has an ash residue characterized by not more than 25% ignition loss.

24. The method of claim 1, wherein said required chemical composition comprises a respective acceptable content range for each of a plurality of chemical composition constituents.

25. The method of claim 1, further comprising, after said step d), burning said fuel simultaneously and physically together with at least one of coal, oil and natural gas.

26. The method of claim 1, wherein said energy value is at least 7000 BTU/lb.

27. The method of claim 1, further comprising, after said step d), burning said fuel in a kiln while firing a raw material mix in said kiln, wherein said required chemical composition of said fuel includes respective required content ranges of at least four most-prevalent constituents of said raw material mix such that respective contents of said four most-prevalent constituents in said raw material mix are not altered when burning said fuel.

28. A waste-derived fuel comprising a substantially homogenous mixture of particles of a plurality of different waste materials blended together, wherein said particles have an average particle size of not more than 1000 microns, and said fuel has an energy value of at least 5500 BTU/lb., an ash content of not more than 50% by weight, and a chemical composition providing an ash composition having an element oxide analysis including $SiO_2$ in a range from about 7 to about 18 percent, $Al_2O_3$ in a range from about 2 to about 7 percent, $Fe_2O_3$ in a range from about 1 to about 10 percent, CaO in a range from about 20 to about 52 percent, and having not more than 10 percent of MgO, not more than 5 percent of total $Na_2O+(0.685)\times(K_2O)$, and not more than 11 percent of $SO_4$.

29. The waste-derived fuel of claim 28, having a moisture content in a range from about 3 to about 8 percent, said energy value being at least 7000 BTU/lb., said ash content being in a range from about 15 to about 30 percent, said $SiO_2$ being in a range from about 10 to about 15 percent, said $Al_2O_3$ being in a range from about 2 to about 4 percent, said $Fe_2O_3$ being in a range from about 2 to about 7 percent, said CaO being in a range from about 35 to about 46 percent, and having not more than 6 percent of MgO, not more than 3 percent of total $Na_2O+(0.685)\times(K_2O)$, and not more than 7 percent of $SO_4$.

30. The waste-derived fuel of claim 28, comprising pellets having an average pellet size in a range from about 1 to about 20 millimeters, wherein each said pellet comprises a plurality of said particles of different waste materials.

31. The waste-derived fuel of claim 30, comprising at least three of said different waste materials.

32. The waste-derived fuel of claim 28, comprising at least five of said different waste materials.

33. The waste-derived fuel of claim 28, wherein said different waste materials in said fuel include paper mill sludge solids in a range from about 40 to about 50 dry weight percent, paper mill lime waste in a range from about 6 to about 10 dry weight percent, municipal waste water treatment sludge in a range from about 0 to about 8 dry weight percent, and wood waste in a range from about 20 to about 45 dry weight percent.

34. The waste-derived fuel of claim 33, wherein said different waste materials in said fuel further include manufacturing wastes containing plastic, in a range from more than 0 to about 15 dry weight percent.

* * * * *